United States Patent
Litwin et al.

(10) Patent No.: US 9,657,966 B2
(45) Date of Patent: May 23, 2017

(54) SINGLE BI-TEMPERATURE THERMAL STORAGE TANK FOR APPLICATION IN SOLAR THERMAL PLANT

(75) Inventors: Robert Zachary Litwin, Canoga Park, CA (US); David Wait, Canoga Park, CA (US); Robert T. Lancet, Canoga Park, CA (US)

(73) Assignee: SOLARRESERVE, Santa Monica, CA (US)

(*) Notice: Subject to any disclaimer, the term of this patent is extended or adjusted under 35 U.S.C. 154(b) by 1428 days.

(21) Appl. No.: 12/639,056

(22) Filed: Dec. 16, 2009

(65) Prior Publication Data

US 2010/0301062 A1  Dec. 2, 2010

Related U.S. Application Data

(60) Provisional application No. 61/183,042, filed on Jun. 1, 2009.

(51) Int. Cl.
*B65D 88/00* (2006.01)
*F24J 2/34* (2006.01)
*F28D 20/00* (2006.01)

(52) U.S. Cl.
CPC ............ *F24J 2/34* (2013.01); *F28D 20/0039* (2013.01); *F28D 2020/0047* (2013.01);
(Continued)

(58) Field of Classification Search
CPC ........... F24J 2/345; Y02E 10/40; Y02E 10/44; Y02B 10/20; B60K 15/077
(Continued)

(56) References Cited

U.S. PATENT DOCUMENTS 1,805,165 A * 5/1931 Denney ................ F22B 13/005
122/155.5
2,218,063 A * 10/1940 Munzer ........................ 181/275
(Continued)

FOREIGN PATENT DOCUMENTS

CH 379093 6/1964
DE 2724416 12/1978
(Continued)

OTHER PUBLICATIONS

Pacheco et al., "Development of a Molten-Salt Thermocline Thermal Storage System for Parabolic Trough Plants," Proceedings of Solar Forum 2001, Solar Energy: The Power to Choose Apr. 21-25, 2001, Washington, D.C.
(Continued)

*Primary Examiner* — Jeffrey Allen
*Assistant Examiner* — Kevin Castillo
(74) *Attorney, Agent, or Firm* — Kagan Binder, PLLC

(57) ABSTRACT

Thermocline storage tanks for solar power systems are disclosed. A thermocline region is provided between hot and cold storage regions of a fluid within the storage tank cavity. One example storage tank includes spaced apart baffles fixed relative to the tank and arranged within the thermocline region to substantially physically separate the cavity into hot and cold storage regions. In another example, a flexible baffle separated the hot and cold storage regions and deflects as the thermocline region shifts to accommodate changing hot and cold volumes. In yet another example, a controller is configured to move a baffle within the thermocline region in response to flow rates from hot and cold pumps, which are used to pump the fluid.

15 Claims, 4 Drawing Sheets

(52) U.S. Cl.
CPC .. *F28D 2020/0091* (2013.01); *F28F 2265/14* (2013.01); *Y02E 10/40* (2013.01); *Y02E 60/142* (2013.01); *Y02E 70/30* (2013.01)

(58) Field of Classification Search
USPC ........................................................ 220/563
See application file for complete search history.

(56) References Cited

U.S. PATENT DOCUMENTS

| | | | |
|---|---|---|---|
| 4,405,010 A | | 9/1983 | Schwartz |
| 4,523,629 A | | 6/1985 | Copeland |
| 4,590,992 A | | 5/1986 | Tamblyn |
| 4,598,694 A | * | 7/1986 | Cromer ........................ 122/19.1 |
| 4,643,212 A | | 2/1987 | Rothrock |
| 4,987,922 A | | 1/1991 | Andrepont et al. |
| 6,877,508 B2 | | 4/2005 | Litwin |
| 7,051,529 B2 | | 5/2006 | Murphy et al. |
| 7,055,519 B2 | | 6/2006 | Litwin |
| 7,296,410 B2 | | 11/2007 | Litwin |
| 7,299,633 B2 | | 11/2007 | Murphy et al. |
| 7,458,418 B2 | | 12/2008 | Sienel |

FOREIGN PATENT DOCUMENTS

| | | |
|---|---|---|
| DE | 102007009199 | 9/2008 |
| JP | 57012239 | 1/1982 |
| WO | 2010000892 | 1/2010 |

OTHER PUBLICATIONS

Search Report for Spanish Application No. 201030807, Nov. 26, 2012.

* cited by examiner

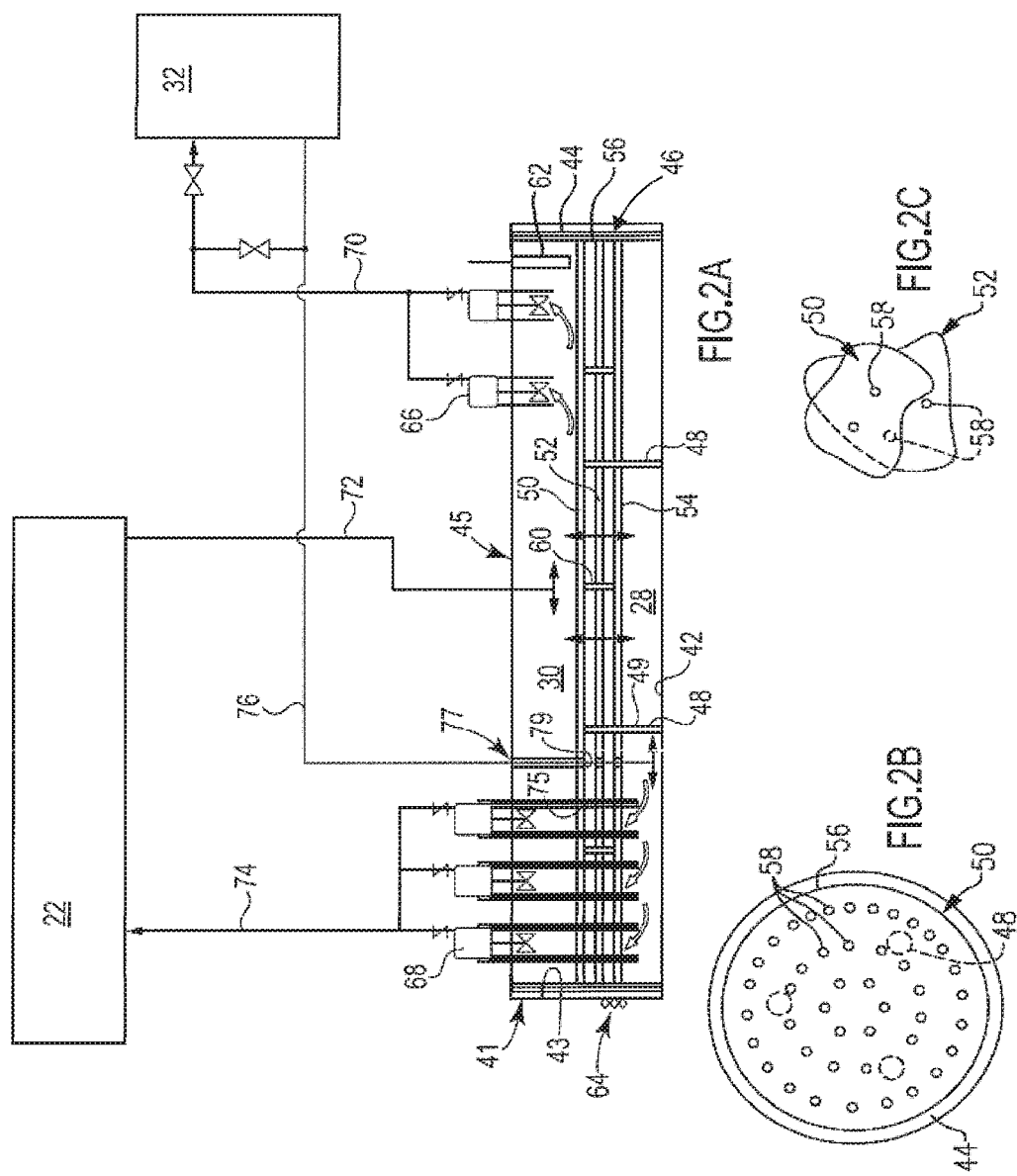

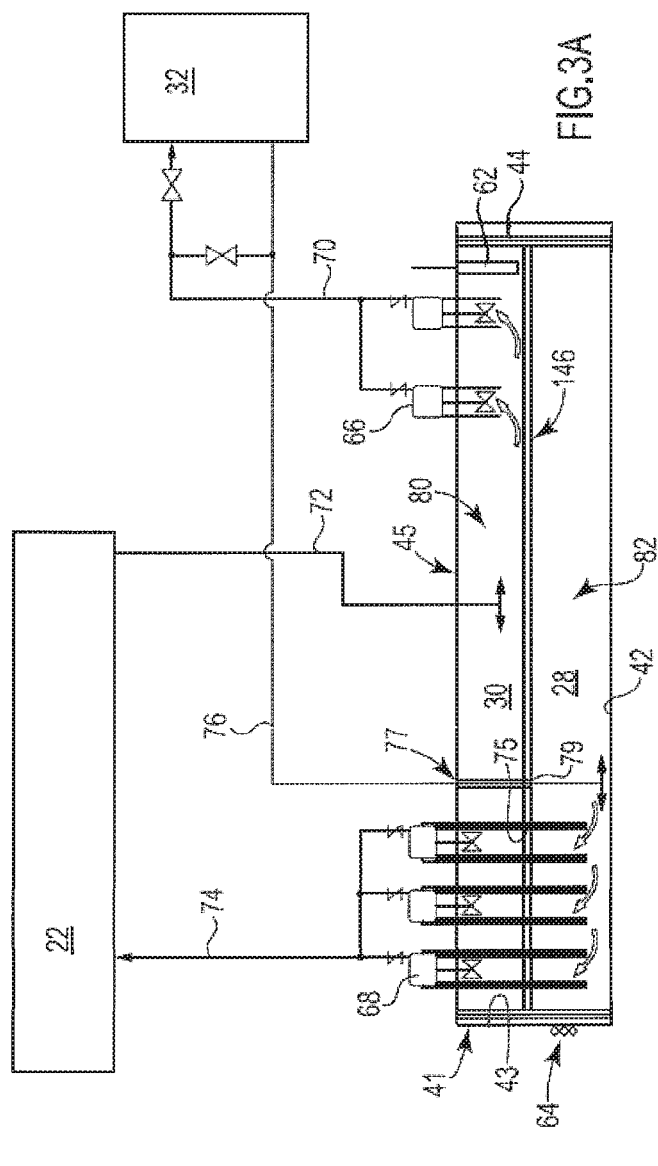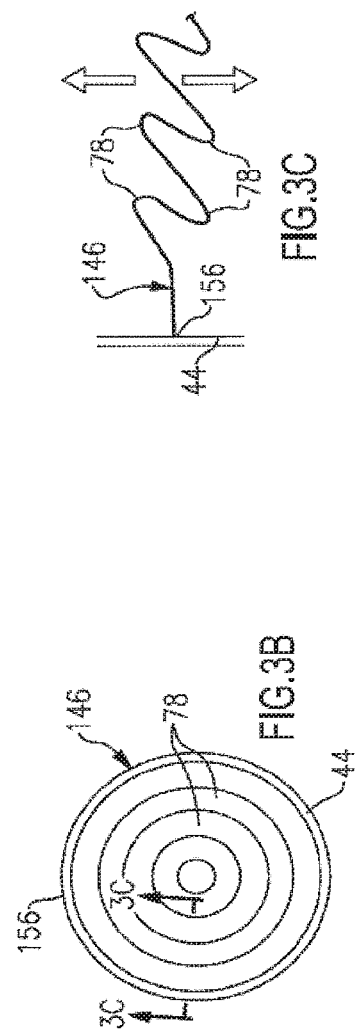

SINGLE BI-TEMPERATURE THERMAL STORAGE TANK FOR APPLICATION IN SOLAR THERMAL PLANT

This application claims priority to U.S. Provisional Application No. 61/183,042, filed on Jun. 1, 2009.

STATEMENT REGARDING FEDERALLY SPONSORED RESEARCH OR DEVELOPMENT

The government may have certain rights to this invention pursuant to Contract No. DE-FOA-0000065 awarded by the United States Department of Energy.

BACKGROUND

This disclosure relates to a thermocline storage tank suitable for use in a solar power system, for example.

Typically two large storage tanks are used for molten salt thermal storage solar plants (power tower or trough designs). These tanks typically can hold well over 50 million pounds of salt each and measure over 125 ft (38 m) in diameter and over 40 ft (12 m) tall. In a power tower system the cold tank is typically fabricated out of a carbon steel material and stores salt at about 550° F. (288° C.). The hot tank can typically be fabricated out of a stainless steel or other high strength alloy and stores salt at about 1050° F. (566° C.).

Each tank is sized to store the entire plant working inventory of molten salt. In the morning, cold salt at 550° F. (288° C.) is pumped out of the cold tank into the solar energy receiver where it is heated to 1050° F. (566° C.) and then stored in the hot tank. When required to produce steam and electrical power, hot salt is pumped out of the hot tank and sent to the steam generator system where it is cooled back to 550° F. (288° C.) and returned to the cold thermal storage tank. In this fashion, salt is "shuttled" back and forth between the two tanks following a diurnal cycle. Thus, there is twice the storage capacity in the combined volume of the two tanks as there is molten salt. At times one tank is generally full and the other generally empty and other times both tanks are partially full.

Salt tanks for large solar power plants are quite expensive and include electrical heat tracing or other forms of heaters, thermal insulation, cooled foundation, instrumentation, and other supplementary equipment including a support structure. To date, designers have studied replacing the hot and cold tanks with a single tank but have not solved the problem of effectively and efficiently precluded the mixing of the hot and cold fluids in a single tank.

BRIEF DESCRIPTION OF THE DRAWINGS

These and other features of the disclosure can be best understood from the following specification and one or more drawings, the following of which is a brief description.

FIG. 2A is a schematic view of an example thermocline storage tank for a solar power system.

FIG. 2B is a top elevational view of a baffle shown in FIG. 2A.

FIG. 2C is a partial top elevational view of spaced apart baffles shown in FIG. 2A.

FIG. 3A is a schematic view of another example thermocline storage tank for a solar power system.

FIG. 3B is a top elevational view of a baffle shown in FIG. 3A.

FIG. 3C is a partial cross-sectional view of the baffle shown in FIG. 3B taken along line 3C-3C.

DETAILED DESCRIPTION

Figure 1A:
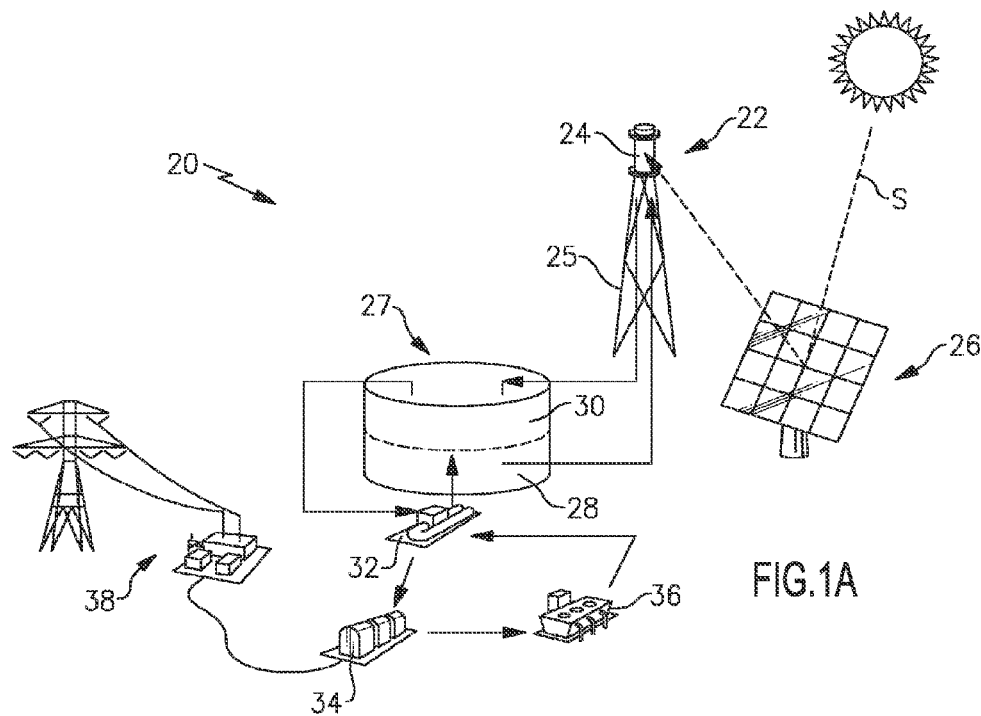
FIG. 1A is a general schematic view of a solar power tower system.

Referring to FIG. 1A, a solar power tower system 20 includes a high concentration central receiver system 22 having a reflector assembly 24 coupled to a tower structure 25 at a predetermined height above ground to receive solar radiation S. Thousands of sun-tracking minors or heliostats 26 reflect solar radiation S onto the reflector assembly 24.

Molten salt or other thermal transfer fluid is communicated to and from a single bi-temperature thermal storage tank or thermocline storage tank 27. The thermocline storage tank 27 includes a cold storage region 28 and a hot storage region 30 in a common tank. "Cold" salt, which is around 550° F. (288° C.) in one example, is communicated from the cold storage region 28 through the central receiver system 22 where it is heated. The "hot" thermal transfer fluid, in the example, salt at around 1050° F. (566° C.), is then communicated to the hot storage region 30. When power is required, the hot molten salt is pumped to a steam generator system 32 that produces steam. The steam drives a steam turbine/generator 34 that creates electricity for communication to a power grid 38. The salt is returned to the cold storage tank system 27 (from the steam generator system 32), where it is stored and eventually reheated in the central receiver system 22. It should be understood that although a particular component arrangement is disclosed in the illustrated embodiment, any arrangement that utilizes a single bi-temperature thermal storage tank would also benefit from the disclosed examples.

Figure 1B:
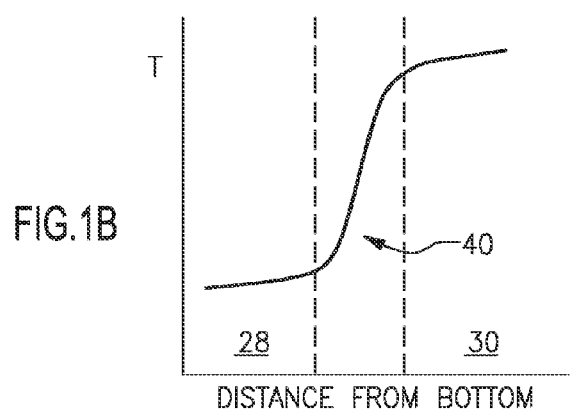
FIG. 1B is a graph generally depicting hot and cold regions of a fluid separated by a thermocline region.

A thermocline storage tank is based on the principle that hot fluid in a quiescent environment tends to rise and stay above colder fluid in the same tank. This phenomenon is also known as thermal stratification, which is graphically illustrated in FIG. 1B as temperature versus distance from the bottom of the storage tank. A thermocline or thermogradient region is the layer in which temperature changes more rapidly with change in depth than do the temperatures in the layers above or below. As the temperature of the hot fluid decreases in the hot storage region 30, its density increases and it tends to "fall" unless the fluid below it is also cooling at an equal or greater rate. The relative densities of the fluid determine its elevational position within the tank. The cold fluid in the cold storage region 28 is much more dense than the hot fluid in the hot storage region 30. The fact that molten salt has a relatively low thermal conductivity tends to aid in this stratification effect. Molten salt can be thought of as liquid insulation. A thermocline region 40 naturally develops and separates the cold and hot storage regions 28, 30. However, this natural separation does not provide efficient enough storage for use in solar power systems.

FIGS. 2A-2C shows a thermocline storage tank having a wall 41 operatively secured to a bottom wall 42 to provide a cavity 45. The wall 41 includes a portion 43 having a geometry or shape interiorly arranged within the storage tank. A fixed baffle assembly 46 is arranged in the thermocline region. A baffle is an obstruction used to substantially separate the cold and hot storage regions 28, 30. The baffle assembly 46 includes vertically spaced first, second and third baffles 50, 52, 54 each providing a perimeter 56. A skirt 44, which is a border of the baffle assembly 46, is provided on the perimeter 56 and has a geometry based upon the portion 43, for example, of a complementary shape to the portion 43 such that the portion 43 and skirt 44 are in a very close fitting relationship. In one example, the skirt 44 is provided by the portion 43 such that the skirt 44 and portion 43 are integrated with one another. The number of baffles is exemplary. The first, second and third baffles 50, 52, 54 are spaced over greater than 5% of the vertical height of the tank to ensure that the shifting thermocline region remains within the baffle assembly 46 during operation. The perimeters 56 are arranged in close proximity to and fixed relative to the outer wall 44. Support posts 48 extend vertically from the bottom wall 42 inboard of the outer wall 44 and operatively connect to at least one baffle. In the example, the support posts 48 extend through apertures 49 in the second and third baffles 52, 54 to the first baffle 50. Brackets 60 may be used to support the first, second and third baffles 50, 52, 54 relative to one another.

The flows in and out of the hot and cold pools disturb the inherent quiescent nature of the thermal stratification. The baffle assembly 46 limits mixing of fluid between the cold and hot storage regions 28, 30 by substantially physically separating the cavity 45 into the cold and hot storage regions 28, 30 as well as reducing thermal conductivity between the fluids. The baffle assembly 46 may include openings or perforations 58 in the baffles, as illustrated by the first baffle 50 in FIG. 2B. Perforations 58 between first and second baffles 50, 52, for example, may be indexed relative to one another to obstruct the free flow of fluid between the cold and hot storage regions 28, 30 during pumping. The baffle assembly 46 has a limited number of flow paths to restrict vertical flow and energy transfer. The combined volumes of the hot and cold storage regions 30, 28 are equal to the total salt inventory and not twice the inventory as required by the current two tank designs. The lower portion of the single tank is exposed to only cold salt and therefore is much less costly to design and support.

In one example, one or more immersion heaters 62 may used to heat the hot storage region fluid, and trace heaters 64 may be used to heat the cold storage region fluid. Cold salt is pumped from one or more cold salt pumps 68 that withdraw fluid from the cold storage region 38 through a cold salt supply line 74. The cold salt supply line 74 extends though apertures 75 in the baffle assembly 46. The salt is heated in the receiver system 22 to 1050° F. (566° C.) and re-enters the tank through a hot salt return line 72, discharging to the hot storage region 30. Salt is withdrawn from the hot storage region 30 at 1050° F. (566° C.) using one or more hot salt pumps 66 through a hot salt supply line 70 and flows to the steam generator 32 before returning through the cold salt return line 76. The cold salt return line 76 extends through apertures 79 in the baffle assembly 46 to the cold storage region 30. The cold salt return line 76 is insulated using insulation 77 as it passes through the hot upper pool to minimize parasitic heat exchange.

FIGS. 3A-3C show a thermocline storage tank with a thin thermocline region surrounding a thin-vertically movable, flexible horizontal baffle 146 that adjusts with the volume of cold and hot salt. The tank ingress and egress flows are the same as described above relative to FIG. 2A. The baffle 146 is considerably thinner than the baffle assembly 46 since it does not have to contain the constantly changing hot/cold pool interface. The baffle 146 acts as a diaphragm and may be provided by an expandable steel membrane, with, for example, corrugations 78, as shown in FIGS. 3B and 3C. The baffle 146 is configured to expand vertically in either direction to accommodate about 95% of either the hot and cold cavities. The baffle 146 expands into the hot and cold pools as hot and or cold salt is added/removed, varying the hot and cold volumes and shifting the thermocline region.

The baffle 146 includes a perimeter 156 that that may be substantially sealed and affixed relative to the wall 41 to separate the cavity 45 into cold and hot cavities, respectively providing the cold and hot storage regions 28, 30. In the example, the portion 43 of the wall 41 is integrated with and provides the skirt 44, such that the portion 43 provides at least a majority of the vertical portion of the wall 41. In one example, the aperture 75 provides a flow area between the cold salt supply line 74 and the flexible baffle 146 is configured to permit limited fluid flow between the hot and cold cavities. The flow area generally corresponds to less than 1% of a horizontal cross-section through the tank cavity at the thermocline region. Alternatively, the cold pumps can be relocated within a small cold salt region along one side of the wall 41.

Figure 4A:
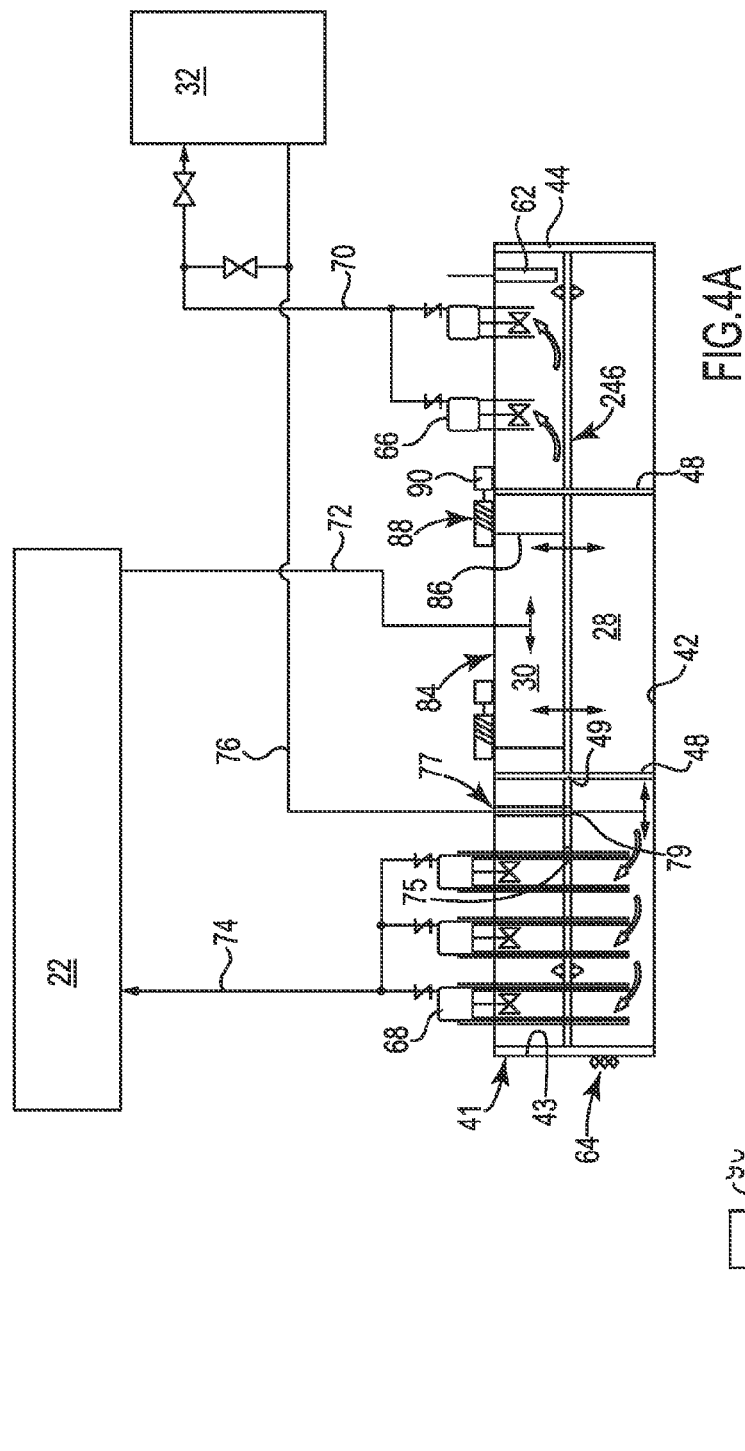
FIG. 4A is a schematic view of yet another example thermocline storage tank for a solar power system.
Figure 4B:
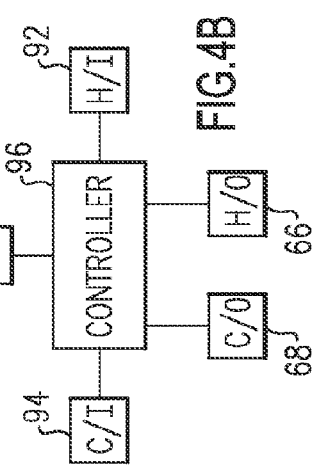
FIG. 4B is a schematic of a control system used to control a movable baffle depicted in FIG. 4A.

Another example storage tank is shown in FIGS. 4A and 4B. A winch system 84 is shown that can vertically drive a movable baffle 246 as the relative volume of hot and cold salt in the tank changes, thus increasing the hot pool capacity with a corresponding decrease in cold pool capacity, and vice versa. The winch system 84 includes a drive element 90 driving a drum 88 about which a cable 86 is wrapped. The cable 86 is connected to the baffle 246. Two winch systems 84 are shown, although fewer or more may be used.

One or more pumps 66 (hot supply), 68 (cold supply), 92 (hot return), 94 (cold return) are used to pump fluid into and out of the cold and hot storage regions 28, 30, which shifts the thermocline region. The location of the thermocline region can be determined by a controller 96, which may communicate with the pumps 66, 68, 92, 94 to determine their respective flow rates. The controller 96 is configured or programmed to adjust the vertical position of the baffle 246 based upon at least one pump flow rate to maintain the baffle 246 in the thermocline region.

Although example embodiments have been disclosed, a worker of ordinary skill in this art would recognize that certain modifications would come within the scope of the claims. For that reason, the following claims should be studied to determine their true scope and content.

The invention claimed is:

1. A tank comprising:
a wall having a portion providing a cavity;
wherein the tank has a horizontal cross-section defining a cross-sectional area, the cross-section accommodating a baffle, the baffle configured to be located in a thermocline region of a fluid within the cavity and vertically separating the cavity into first and second regions, and configured to permit substantially limited flow between the first region and the second region wherein the baffle has a flow area comprising one or more aperture(s), wherein the flow area is configured to permit fluid flow between the first and second regions, the flow area corresponding to less than 1% of the cross-sectional area; and
a skirt attached to the baffle, the skirt having a geometry based at least in part on the portion, the skirt proximate to the portion.

2. The tank of claim 1, wherein the portion defines at least a majority of a vertical portion of the wall.

3. The tank of claim 1, wherein the baffle substantially separates the first and second regions respectively into a first volume and a second volume.

4. The tank of claim 3, wherein a hot fluid is in the first volume and a cold fluid is in the second volume.

5. The tank of claim 4, wherein a mixing of the hot fluid and the cold fluid is limited by the baffle.

6. The tank of claim 5, wherein the baffle includes plural apertures configured to permit substantially limited flow between the first volume and the second volume.

7. A tank comprising:
a wall having a portion providing a cavity;
wherein the tank has a horizontal cross-section defining a cross-sectional area, the cross-section accommodating a membrane, the membrane configured to be located in a thermocline region of a fluid within the cavity and vertically separating the cavity into first and second regions, and configured to permit substantially limited flow between the first region and the second region wherein the membrane has a flow area comprising one or more aperture(s), wherein the flow area configured to permit fluid flow between the first and second regions, the flow area corresponding to less than 1% of the cross-sectional area; and
a skirt attached to the membrane, the skirt having a geometry based at least in part on the portion, the skirt proximate to the portion.

8. The tank of claim 7, wherein the portion is a vertical portion.

9. The tank of claim 7, wherein the membrane substantially separates the first and second regions respectively into a first volume and a second volume.

10. The tank of claim 9, wherein a hot fluid is in the first volume and a cold fluid is in the second volume.

11. The tank of claim 10, wherein a mixing of the hot fluid and the cold fluid is limited by the membrane.

12. The tank of claim 11, wherein the membrane includes plural apertures configured to permit substantially limited flow between the first volume and the second volume.

13. A tank comprising: a wall having a portion providing a cavity; a baffle configured to be located in a thermocline region of a fluid within the cavity and vertically separating the cavity into first and second regions, and configured to permit substantially limited flow between the first region and the second region; a skirt attached to the baffle, the skirt having a geometry based at least in part on the portion, the skirt proximate to the portion; and wherein the tank has a width and height, and the width is greater than the height; wherein the tank has a horizontal cross-section defining a cross-sectional area, the cross sectional accommodating the baffle, wherein the baffle has a flow area comprising one or more aperture(s), wherein the flow area is configured to permit fluid flow between the first and second regions, the flow area corresponding to less than 1% of the cross-sectional area.

14. A tank comprising: a wall having a portion providing a cavity; a membrane configured to be located in a thermocline region of a fluid within the cavity and vertically separating the cavity into first and second regions, and configured to permit substantially limited flow between the first region and the second region; a skirt attached to the membrane, the skirt having a geometry based at least in part on the portion, the skirt proximate to the portion; and wherein the tank has a width and height, and the width is greater than its height; wherein the tank has a horizontal cross-section defining a cross-sectional area, the cross-section accommodating the membrane, wherein the membrane has a flow area comprising one or more aperture(s), wherein the flow area is configured to permit fluid flow between the first and second regions, the flow area corresponding to less than 1% of the cross-sectional area.

15. The tank of claim 1 configured for use with a fluid at a temperature of at least 288° C.

* * * * *

UNITED STATES PATENT AND TRADEMARK OFFICE
CERTIFICATE OF CORRECTION

PATENT NO. : 9,657,966 B2
APPLICATION NO. : 12/639056
DATED : May 23, 2017
INVENTOR(S) : Robert Zachary Litwin et al.

It is certified that error appears in the above-identified patent and that said Letters Patent is hereby corrected as shown below:

On the Title Page

(73) Assignee:
"SOLARRESERVE" should be --SOLARRESERVE TECHNOLOGY, LLC--.

Signed and Sealed this
Second Day of April, 2019

Andrei Iancu
*Director of the United States Patent and Trademark Office*